United States Patent Office 2,824,864
Patented Feb. 25, 1958

2,824,864

COMPLEX COBALT COMPOUNDS

Arthur Buehler, Rheinfelden, Switzerland, assignor to Ciba Limited, Basel, Switzerland, a Swiss firm No Drawing. Application February 5, 1954
Serial No. 408,587

Claims priority, application Switzerland February 11, 1953

10 Claims. (Cl. 260—145)

This invention provides new complex cobalt compounds of monoazo-dyestuffs free from sulfonic acid and carboxylic acid groups and having the general formula (1)
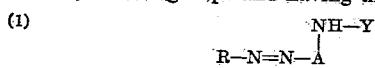

in which R represents the radical of a diazo-component which is bound to the azo linkage in a position vicinal to a hydroxyl group, Y represents an alkyl or advantageously aryl radical which may contain substituents, and A represents a naphthalene radical which is bound to the azo linkage in a position vicinal to the —NH—Y group.

Especially valuable are those cobalt compounds which contain one atom of cobalt bound in complex union to two molecules of monoazo-dyestuffs, and especially those cobalt compounds of this constitution which contain a monoazo-dyestuff containing a sulfone group or a sulfonic acid amide group.

The invention also includes a process for making the above cobalt compounds by treating a monoazo-dyestuff of the above Formula 1 with an agent yielding cobalt.

The monoazo-dyestuffs of the above formula used as starting materials in the process of this invention can be obtained from ortho-hydroxy-diazo-compounds free from sulfonic acid and carboxylic acid groups, advantageously such compounds of the benzene series, and from amino naphthalenes capable of coupling in a position vicinal to a secondary amino group and also free from sulfonic acid and carboxylic acid groups. As diazo-compounds there may be mentioned above all those which contain as a substituent a nitro group and/or a sulfone group or a sulfonic acid amide group or both of the two latter groups. As examples of such diazo-compounds there may be mentioned those obtainable from the following amines:

2-amino-1-hydroxybenzene-4- or -5-methyl sulfone, 2 - amino - 1 - hydroxybenzene - 4 - or - 5 - ethyl sulfone, 4 - chloro - 2 - amino - 1 - hydroxybenzene - 6-methyl sulfone, 6 - chloro - 2 - amino - 1 - hydroxybenzene - 4 - methyl sulfone, 2 - amino - 1 - hydroxybenzene-4 - or - 5 - n - propyl sulfone, 2 - amino - 1 - hydroxybenzene - 4 - or - 5 isopropyl sulfone, 2 - amino - 1 - hydroxybenzene - 4 - or - 5 - n - butyl sulfone, 2 - amino - 1 - hydroxy - 4 - chlorobenzene - 6 - phenyl sulfone, and also 3 - amino - 4 - hydroxy - diphenyl sulfone, 3 - amino - 4 - hydroxy - diphenyl - x - sulfone acid amide, 4 - amino - 3 - hydroxydiphenyl sulfone, 2 - amino - 1 - hydroxybenzene-4 - or - 5 - benzyl sulfone, 3 - amino - 4 - hydroxy - 4'-methyl - 1:1' - diphenyl sulfone, 3 - amino - 4 -hydroxy-4' - methoxy - 1:1' - diphenyl sulfone, 4 - amino - 3 - hydroxy - 4' - methyl - 1:1' - diphenyl sulfone, 3 - amino-4 - hydroxy - 4' - chloro - 1:1' - diphenyl sulfone, 6-nitro - 2 - amino - 1 - hydroxybenzene - 4 - sulfonic acid-N - phenyl - amide - 4' - methyl sulfone, and especially 2 - amino - 1 - hydroxybenzene - 4 - or - 5 - sulfonic acid amide and the corresponding -methyl-, -ethyl-, -isopropyl-, -n-butyl-, -secondary butyl-, -tertiary butyl-, -hydroxyethyl-, -benzyl-, -cyclohexyl- or -phenylamide, and also the corresponding -dimethyl-, -diethyl-, -dibutyl-, -N-methyl-N-β-hydroxyethyl-, -N-methylphenyl- or -N-ethyl - phenyl - amides, 4 - chloro - 2 - amino - 1 - hydroxybenzene - 6 - sulfonic acid amide, 4 - methoxy - 2-amino - 1 - hydroxybenzene - 5 - sulfonic acid amide, 4 - chloro - 2 - amino - 1 - hydroxybenzene - 5 - sulfonic acid amide, 6 - chloro - 2 - amino - 1 - hydroxybenzene-4 - sulfonic acid amide or advantageously the following compounds containing nitro groups, 4 - nitro - 2 - amino-1 - hydroxybenzene - 6 - methyl sulfone, 6 - nitro - 2-amino - 1 - hydroxybenzene - 4 - methyl sulfone, 2 - amino - 1 - hydroxy - 6 - nitrobenzene - 4 - phenyl sulfone, 2 - amino - 1 - hydroxy - 4 - nitrobenzene - 6-phenyl sulfone, 2 - amino - 1 - hydroxy - 6 - nitrobenzene-4 - benzyl sulfone, 2 - amino - 1 - hydroxy - 4 - nitrobenzene - 6 - benzyl sulfone, 6 - nitro - 2 - amino - 1 - hydroxybenzene - 4 - sulfonic acid amide or 4 - nitro - 2-amino - 1 - hydroxybenzene - 6 - sulfonic acid amide and the corresponding -alkyl-, -hydroxyalkyl-, -N-alkyl-N-hydroxylalkyl-, or -phenyl-amides; and also compounds free from sulfone and sulfonic acid amide groups, which are advantageously coupled with coupling components containing sulfone or sulfonic acid amide groups, such as 4-nitro-, 4-chloro- or 4-methoxy-2-amino-1-hydroxybenzene, 3-amino-4-hydroxyacetophenone, 4:6-dichloro-2-amino-1-hydroxybenzene, 4-methoxy-5-chloro-2-amino-1-hydroxybenzene and advantageously 5-nitro-2-amino-1-hydroxybenzene, 4-chloro-5-nitro-2-amino-1-hydroxybenzene, 4-nitro-6-chloro-2-amino-1-hydroxybenzene, 4-nitro-6-acetylamino-2-amino-1-hydroxybenzene, 6-nitro-4-acetylamino-2-amino-1-hydroxybenzene, or 6-nitro-4-chloro-2 - amino - 1 - hydroxybenzene, 4:6 - dinitro - 2 - amino-1-hydroxybenzene.

As coupling components there come into consideration secondary naphthylamines which are free from sulfonic acid and carboxylic acid groups and are capable of coupling in a position vicinal to the amino group. Above all there may be mentioned amino naphthalene compounds of this kind of which the amino group is substituted by an alkyl radical or advantageously an aryl radical which may contain substituents, for example: 1-phenylaminonaphthalene-4-methyl sulfone, 1-benzylaminonaphthalene-4-sulfonic acid amide, 1-phenylaminonaphthalene-4-sulfonic acid amide, 1-phenylaminonaphthalene-4-sulfonic acid methyl- or -phenylamide, and advantageously β-naphthylamine derivatives, such as 2-methylaminonaphthalene, 2-hydroxyethylaminonaphthalene, 2-phenylaminonaphthalene, 2-phenylaminonaphthalene-6-methyl sulfone, 2-phenylaminonaphthalene-6-sulfonic acid amide, 2 - phenylaminonaphthalene - 6 - sulfonic acid isopropylamide, 2-phenylaminonaphthalene-2'-, -3'- or -4'-sulfonic acid amide, 2-phenylaminonaphthalene-2'- or -4'-methyl- or -ethylsulfone, 2-phenylaminonaphthalene-6-sulfonic acid isopropylamide-2'-, -3'- or -4'-sulfonic acid amide, 2-phenylaminonaphthalene-6-sulfonic acid amide-3'-sulfonic acid methylamide, and also the compounds of the formulae

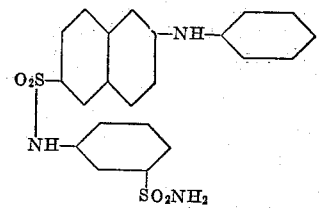

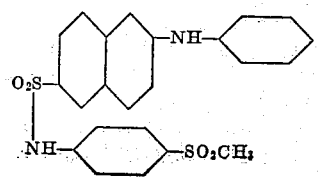

and

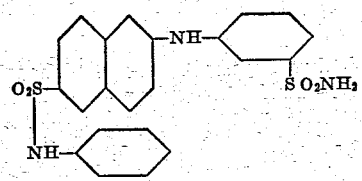

These secondary naphthylamines used as coupling components are in part known or can be made by methods in themselves known. The 2-naphthylamines in question can be made, for example, by the method of Bucherer from the appropriate 2-hydroxynaphthalenes by reaction with alkylamines or arylamines in the presence of an alkali bisulfite under pressure.

The diazo compounds mentioned above, and obtainable in the usual manner, may be coupled with the coupling components in the usual manner, for example, in a neutral to acid medium.

After the coupling reaction the dyestuffs can easily be isolated from the coupling mixture by filtration, since they are generally sparingly soluble in water.

As agents yielding cobalt for use in the process of the invention there come into consideration complex cobalt compounds of aliphatic hydroxy-carboxylic acids or dicarboxylic acids, and also simple cobalt salts such as cobalt acetate and cobalt sulfate, or if desired cobalt hydroxide. The treatment of the monoazo-dyestuffs obtained as described above with an agent yielding cobalt is advantageously carried out in a weakly acid, neutral or especially an alkaline medium. It is generally recommended to use less than one but at least half an atomic proportion of cobalt for each molecular proportion of a monoazo-dyestuff.

The metallization of the dyestuff is advantageously carried out at a raised temperature under atmospheric or superatmospheric pressure, if desired in the presence of a suitable addition, for example, in the presence of a salt of an organic acid, a base, an organic solvent or another agent capable of assisting the formation of the complex.

In one form of the process there is used as starting material a mixture of two different metallizable monoazo-dyestuffs of which one corresponds to the general Formula 1 above, and the other also corresponds to the said formula or is an ortho:ortho'-dihydroxy-monoazo-dyestuff free from sulfonic acid and carboxylic acid groups. As ortho:ortho'-dihydroxy-monoazi-dyestuffs there come into consideration more especially those of the benzene-azo-acylacetic acid amide series, and above all those which contain an aromatically bound sulfuric acid amide group or sulfone group. These ortho:ortho'-dihydroxy-monoazo dyestuffs can be made by methods in themselves known from the diazo-components mentioned above and coupling components capable of coupling in a position vicinal to an aromatically bound hydroxyl group or an enolizable or enolized keto group, such as hydroxy-naphthalenes, 5-pyrazolones or advantageously aceto-acetic acid arylides.

The new cobaltiferous dyestuffs of this invention are soluble in water, and are indeed more soluble than the parent dyestuffs used for making them. They are suitable for dyeing and printing a very wide variety of materials, but above all for dyeing animal materials such as silk, leather and especially wool, and are also suitable for dyeing or printing synthetic fibers of superpolyamides and superpolyurethanes. They are especially suitable for dyeing from weakly alkaline or neutral to weakly acid, for example, acetic acid, baths. Wool dyeings so produced are distinguished by their level character, good fastness to light, and very good fastness to washing, fulling, carbonizing and decatizing.

The following examples illustrate the invention, the parts and percentages being by weight unless otherwise stated and the relationship of parts by weight to parts by volume being the same as that of the kilogram to the liter:

*Example 1*

15.4 parts of 4-nitro-2-amino-1-hydroxybenzene are dissolved in 100 parts of water with the addition of 4 parts of sodium hydroxide. After the addition of 25 parts by volume of a 4 N-solution of sodium nitrite, the solution is introduced dropwise into a mixture of 24 parts of hydrochloric acid of 30 percent strength and 100 parts of ice. Into the diazo-compound so obtained is run a hot solution of 30.0 parts of 2-phenylaminonaphthalene-3'-sulfonic acid amide (obtained, for example, by the reaction of 2-hydroxynaphthalene-3-carboxylic acid with 1-aminobenzene-3-sulfonic acid amide in the presence of sodium bisulfite at a raised temperature under pressure), 10 parts of hydrochloric acid of 30 percent strength and 100 parts of dimethyl-formamide, and the whole is stirred at 30–40° C. until the coupling is complete. The precipitated dyestuff is filtered off, and washed with water and dried. It is a red powder which dissolves in dilute sodium hydroxide solution with a red coloration and in concentrated sulfuric acid with a violet coloration.

4.63 parts of the dyestuff so obtained are dissolved in 200 parts of water with the addition of 10 parts by volume of a 2 N-solution of sodium hydroxide, the mixture is heated to 80° C. and mixed with 10 parts by volume of a cobalt sulfate solution having a cobalt content of 3.25 percent. After stirring the whole for ½ to ¾ hour at 80° C., the metallization is finished. The cobalt complex is precipitated by the addition of sodium chloride, and filtered off and dried. It is a black powder which dissolves in water with a blue-green coloration and in concentrated sulfuric acid with a violet coloration, and dyes wool from a weakly alkaline or neutral to weakly acetic acid bath olive tints having good properties of fastness.

*Example 2*

15.4 parts of 5-nitro-2-amino-1-hydroxybenzene are dissolved in 60 parts of water with the addition of 4 parts of sodium hydroxide, and the solution is mixed with 25 parts by volume of a 4 N-solution of sodium nitrite and slowly poured into 200 parts of a solution of naphthalene-1-sulfonic acid of 15.5 percent strength by volume, the temperature being maintained below +8° C. by external cooling. A hot solution of 30 parts of 2-phenylaminonaphthalene-3'-sulfonic acid amide in 10 parts of hydrochloric acid of 30 percent strength and 100 parts of dimethylformamide is run into the diazo-suspension, and the whole is stirred for a few hours at room temperature, and at 50–60° C. in the later stages, until coupling is finished. The precipitated dyestuff is filtered off while hot and washed. When dry it is a black-brown powder which dissolves in dilute sodium hydroxide solution and in concentrated sulfuric acid with a violet coloration.

4.63 parts of the dyestuff so obtained are suspended in 100 parts of water and heated to 50° C. After the addition of a solution of 0.755 part of cobalt sulfate, 0.75 part of tartaric acid and 5 parts of caustic soda solution of 30 percent strength in 50 parts of water, the whole is heated to 80° C. and stirred at that temperature for 30 minutes. The cobalt complex is completely precipitated by the addition of sodium chloride and partial neutralization with acetic acid, and is filtered off and dried. There is obtained a black powder which dissolves in water with a blue coloration and in concentrated sulfuric acid with a violet coloration, and dyes wool from a weakly alkaline, neutral or weakly acetic acid bath strong bluish green tints having good properties of fastness.

In the following table are given additional cobalt complexes which can be obtained in an analogous manner from the components given in columns I and II, and which dye wool the tints given in column III:

| | I | II | III |
|---|---|---|---|
| 1 | 2-amino-4-nitrophenol (OH, NH₂, NO₂) | 2-naphthylamine-N-(phenyl-SO₂NHCH₃) | bluish green. |
| 2 | 2-amino-4-nitrophenol | 2-naphthylamine-N-(phenyl-SO₂CH₃) | green grey. |
| 3 | 2-amino-4-nitrophenol | 2-naphthylamine (SO₂NH₂ substituted)-NH-phenyl | greenish blue. |
| 4 | 2-amino-4-nitro-6-methylsulfonylphenol (O₂N, OH, NH₂, SO₂CH₃) | N-methyl-2-naphthylamine (NHCH₃) | greyish green. |
| 5 | 2-amino-4-nitro-6-methylsulfonylphenol | N-(2-hydroxyethyl)-2-naphthylamine (NHCH₂CH₂OH) | Do. |
| 6 | 2-amino-4-nitro-6-methylsulfonylphenol | 2-naphthylamine-N-(phenyl-SO₂NHCH₃) | greenish olive. |

The dyestuff No. 1 of this table is the complex cobalt compound containing one atom of cobalt in complex union with two molecules of the monoazo dyestuff of the formula

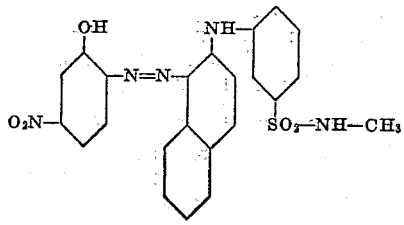

while the dyestuff No. 6 is the complex cobalt compound containing one atom of cobalt in complex union with two molecules of the monoazo dyestuff of the formula

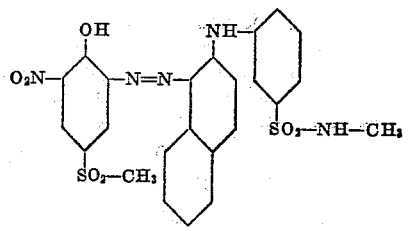

*Example 3*

4.63 parts of the dyestuff from diazotized 5-nitro-2-amino-1-hydroxybenzene and 2-phenylaminonaphthalene-3'-sulfonic acid amide and 4.18 parts of the dyestuff from diazotized 2-amino-1-hydroxybenzene-4-sulfonic acid isopropylamide and acetoacetic acid anilide are suspended in 200 parts of water and heated to 50° C. After the addition of a solution of 1.55 parts of cobalt sulfate, 1.5 parts of tartaric acid, and 10 parts by volume of sodium hydroxide solution of 30 percent strength in 100 parts of water the whole is heated to 80° C. After about 30 minutes the metallization is finished. The cobalt complex compound containing one atom of cobalt in complex union with one molecule of each of the two monoazo dyestuffs corresponding to the formulae

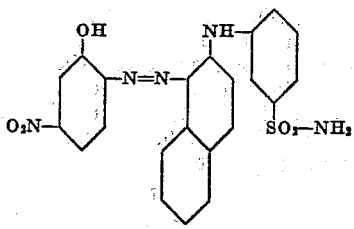

and

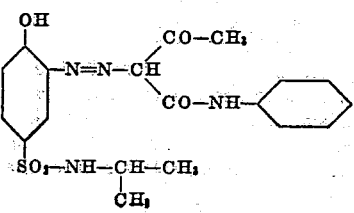

is precipitated by the addition of sodium chloride and acetic acid and filtered off. When dry it is a greenish black powder which dissolves in water with a green coloration and in concentrated sulfuric acid with a brown-violet coloration, and dyes wool from a weakly alkaline, neutral or weakly acid bath green tints.

Similar cobalt mixed complexes are obtained by the method described above from the monoazo-dyestuffs given in columns I and II of the following table, the tints of the dyeings on wool being given in column III:

| | I | II | III |
|---|---|---|---|
| 1 | | | green. |
| 2 | | | khaki. |
| 3 | | | blue. |

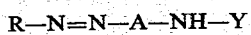
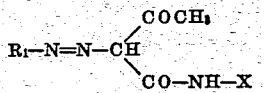

Example 4

0.5 part of cobaltiferous dyestuff obtainable as described in Example 1 is dissolved in 4000 parts of water, and 100 parts of well wetted wool are entered into the resulting dyebath at 40–50° C. 2 parts of acetic acid of 40 percent strength are then added, the bath is raised to the boil in the course of ½ hour and dyeing is carried on for ¾ hour at the boil. Finally the wool is rinsed with cold water and dried. There is obtained a level olive dyeing of good fastness to washing and fulling.

Practically the same dyeing is produced when no acetic acid is added to the dyebath.

What is claimed is:

1. A complex cobalt compound containing one atom of cobalt bound in complex union with two monoazo dyestuffs free from sulfonic and carboxylic acid groups, of which one contains a member selected from the group consisting of a sulfone and a sulfonamide group bound to an aromatic nucleus of the dyestuff molecule which corresponds to the formula (1)
$$R-N=N-A\overset{NH-Y}{|}$$

wherein R represents a hydroxybenzene radical bound to the azo linkage in ortho position relatively to the hydroxyl group, Y represents a member of the group consisting of a lower alkyl, a lower hydroxyalkyl and a benzene radical, and A represents a naphthalene radical bound to the azo linkage in 1-position and bearing the NH—Y group in 2-position, the second dyestuff bound to the cobalt atom being a member selected from the group consisting of an ortho:ortho'-dihydroxy monoazo dyestuff containing a hydroxybenzene radical bound to the azo group in ortho position relatively to the hydroxyl group and a dyestuff of said Formula 1.

2. A complex cobalt compound containing one atom of cobalt bound in complex union with two monoazo dyestuffs free from sulfonic and carboxylic acid groups and corresponding to the formula $$R-N=N-A-NH-Y$$

wherein R represents a hydroxybenzene radical bound to the azo linkage in ortho position relatively to the hydroxy group, Y represents a benzene radical and A a naphthalene radical bound to the azo linkage in 1-position and bearing the NH—Y group in 2-position, at least one of the radicals R, A and Y containing a substituent selected from the group consisting of a sulfone group and a sulfonic acid amide group.

3. A complex cobalt compound containing one atom of cobalt bound in complex union with two monoazo dyestuffs free from sulfonic and carboxylic acid groups and corresponding to the formula $$O_2N-R-N=N-A-NH-Y$$

wherein R represents a hydroxybenzene radical bound to the azo linkage in ortho position relatively to the hydroxy group, Y represents a benzene radical and A a naphthalene radical bound to the azo linkage in 1-position and bearing the NH—Y group in 2-position, at least one of the radicals R, A and Y containing a substituent selected from the group consisting of a sulfone group and a sulfonic acid amide group.

4. A complex cobalt compound containing one atom of cobalt bound in complex union with two monoazo dyestuffs free from sulfonic and carboxylic acid groups, of which one corresponds to the formula $$R_1-N=N-CH\begin{matrix}COCH_3\\CO-NH-X\end{matrix}$$

and the other to the formula $$O_2N-R-N=N-A-NH-Y$$

in which formulate R and $R_1$ represent hydroxybenzene radicals bound to the azo linkage in ortho position to the hydroxyl group, X and Y represent benzene radicals and A represents a naphthalene radical bound to the azo linkage in 1-position and bearing the NH—Y group in 2-position, at least one of the radicals R, A and Y containing a substituent selected from the group consisting of a sulfone group and a sulfonic acid amide group.

5. A complex cobalt compound containing one atom of cobalt bound in complex union with two monoazo dyestuffs free from sulfonic and carboxylic acid groups and corresponding to the formula

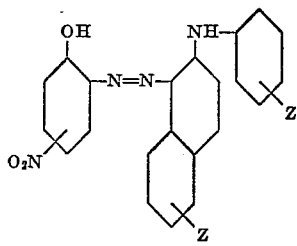

wherein one Z represents a sulfonic acid amide group and the other Z a hydrogen atom.

6. A complex cobalt compound containing one atom of cobalt bound in complex union with two monoazo dyestuffs free from sulfonic and carboxylic acid groups, of which one corresponds to the formula

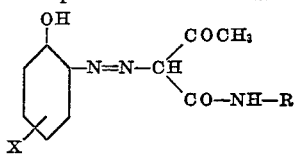

and the other to the formula

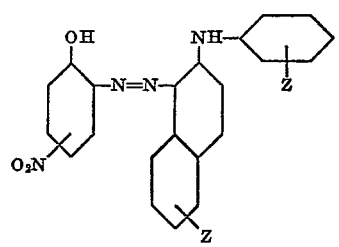

wherein X represents a sulfonic acid amide group, R represents a benzene radical, one Z represents a sulfonic acid amide group and the other Z a hydrogen atom.

7. The complex cobalt compound containing one atom of cobalt in complex union with two molecules of the monoazo dyestuff of the formula

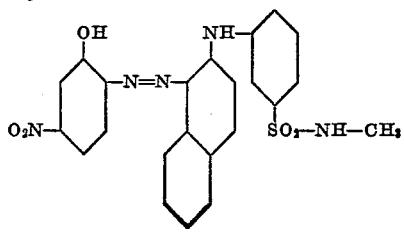

8. The complex cobalt compound containing one atom of cobalt in complex union with two molecules of the monoazo dyestuff of the formula

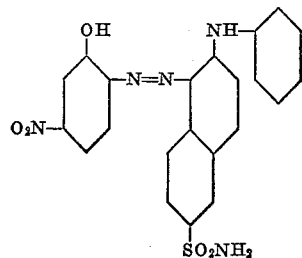

9. The complex cobalt compound containing one atom of cobalt in complex union with two molecules of the monoazo dyestuff of the formula

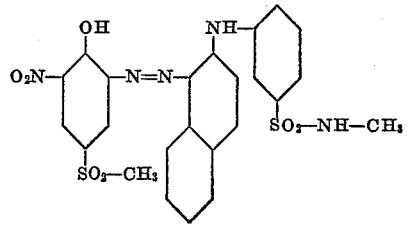

10. The complex cobalt compound containing one atom of cobalt in complex union with one molecule of each of the two monoazo dyestuffs corresponding to the formulae

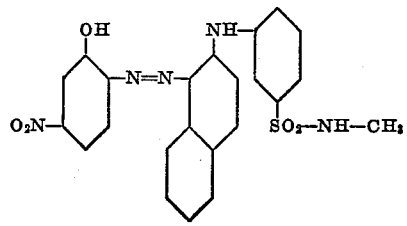

and

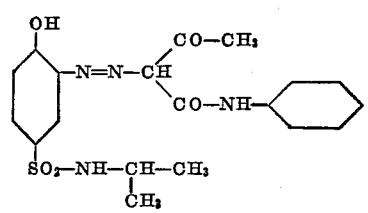

References Cited in the file of this patent
UNITED STATES PATENTS

| | | |
|---|---|---|
| 1,823,939 | Hentrich et al. | Sept. 22, 1931 |
| 2,565,898 | Widmer et al. | Aug. 28, 1951 |
| 2,674,515 | Widmer et al. | Apr. 6, 1954 |

U. S. DEPARTMENT OF COMMERCE
PATENT OFFICE

CERTIFICATE OF CORRECTION

Patent No. 2,824,864     Arthur Buehler     February 25, 1958

It is hereby certified that error appears in the printed specification of the above numbered patent requiring correction and that the said Letters Patent should read as corrected below.

Column 1, line 59, for "sulfone acid amide" read -- sulfonic acid amide --; column 2, line 19, for "hydroxylalkyl" read -- hydroxyalkyl --; column 3, line 49, for "-monoazi-" read -- -monoazo- --; column 9, line 1, for "formulate" read -- formulae --.

Signed and sealed this 24th day of June 1958.

(SEAL)
Attest:

KARL H. AXLINE
Attesting Officer

ROBERT C. WATSON
Commissioner of Patents